J. PERRIE.
LOCK NUT MECHANISM.
APPLICATION FILED NOV. 15, 1909.
959,162.
Patented May 24, 1910.
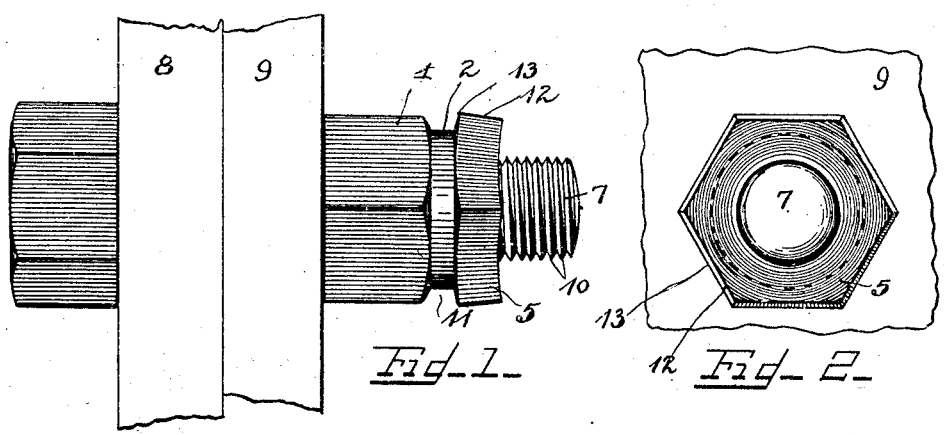
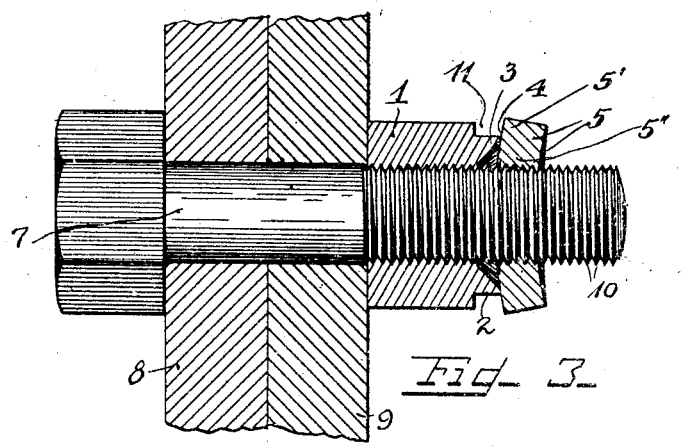
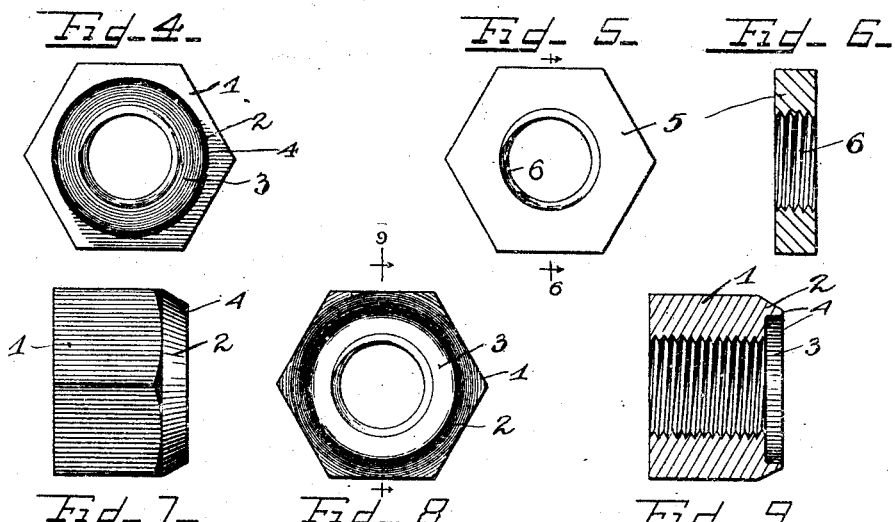
Witnesses
Charles J. Schmitt
S. N. Pond
Inventor
John Perrie
By Offield, Towle, Graves & Offield,
Attys.

UNITED STATES PATENT OFFICE.

JOHN PERRIE, OF ROSELAND, ILLINOIS.

LOCK-NUT MECHANISM.

959,162.  Specification of Letters Patent.  Patented May 24, 1910.

Application filed November 15, 1909. Serial No. 527,979.

*To all whom it may concern:*

Be it known that I, JOHN PERRIE, a resident of Roseland, in the county of Cook and State of Illinois, have invented certain new and useful Improvements in Lock-Nut Mechanism, of which the following is a full, clear, and precise specification.

My invention relates to lock nut mechanism and contemplates improved construction and operation thereof.

Among the important objects of my invention are to provide an arrangement in which a main nut remains in standard form and retains its full efficiency, but is provided with an extension forming an integral part thereof; to provide a flexible supplemental nut for coöperating with the extension on the main nut whereby both main and supplemental nuts upon application to a bolt will mutually rigidly lock themselves to the bolt; to provide such construction and arrangement that the application of the main and supplemental nuts will not injure the bolt threads; to provide a construction in which the supplemental nut will always maintain its gripping engagement with, and position on, the bolt, irrespective of loosening of the main nut due to shrinkage or other movement of the work to be secured; to provide such arrangement that upon loosening of the main nut the supplemental nut can be re-set and drawn up against the main nut to resume locking conditions; to provide such construction and arrangement that the main and supplemental nuts can be readily and inexpensively manufactured by machinery; and in general to produce more simple and more reliable lock nut mechanism.

In general my invention comprises a main nut of standard form having an annular flange protruding from its outer face and surrounding an annular pocket, and a supplemental comparatively thin and flexible nut which when applied to the bolt threads will abut against the flange end to have its outer section deflected outwardly and its inner section drawn into the annular pocket, such engagement causing firm clamping engagement of the supplemental nut threads with the bolt threads both in a radial and a longitudinal direction.

My invention is described more in detail in the following specification and illustrated on the accompanying drawing, in which drawing—

Figure 1 is an elevation view of a nut with my improved lock nut mechanism applied thereto to secure two plates together, Fig. 2 is a view from the right end of Fig. 1, Fig. 3 is a vertical diametral sectional view of the parts shown in Fig. 1, Fig. 4 is a plan view of the locking end of the main nut, Fig. 5 is a plan view of the supplement nut showing its primary form, Fig. 6 is a sectional view taken on plane 6—6, Fig. 5, Fig. 7 is a side elevation of a modified form of main nut, Fig. 8 is a view of the locking face of the nut in Fig. 7, and Fig. 9 is a sectional view taken on plane 9—9, Fig. 8.

Referring to Figs. 1 to 4, the main nut 1 is of standard form except that an annular flange 2 is provided at its outer face, the inner part of this flange being cut away to leave an annular pocket 3 with a more or less pointed outer end 4, the outer surface of the flange being substantially cylindrical and some distance within the outer surfaces of the nut. Referring to Figs. 5 and 6, the supplemental nut 5 is primarily flat and has internal threads 6. Referring to Figs. 1 and 2, a bolt 7 is applied through objects 8 and 9 to be clamped together. The main nut 1 is first applied to the bolt threads 10 and is drawn up tightly against the objects. The supplemental nut 5 is then applied to the bolt threads and drawn up tightly against the annular end 4 of the flange 2. Engagement of the end 4 with the supplemental nut is along a line between the threads 6 and the outer periphery of the supplemental nut, and the result of such engagement and tightening of the nut is to cause flexure of the nut, the outer section 5' deflecting outwardly and the inner section 5" being drawn inwardly into the pocket 3, as shown, this flexure and distortion of the nut causing radial contraction of the nut to bring its threads 6 into powerful clamping engagement with the bolt threads 10, and this radial contraction is uniform in all directions so that the threads 10 will not be distorted or injured. Besides this radial clamping of the bolt threads upon radial contraction of the nut the threads 6 will also have powerful clamping engagement with the bolt threads in a longitudinal direction, owing to the drawing into pocket 3 of the inner section 5" of the supplemental nut. The radial clamping effect exerted by the nut increases from the inside to the outside of the nut. Slight movement of the main nut as upon shrinkage or displacement of the objects 8 and 9 will be followed by the supplemental nut, owing to its elasticity, but this compensating movement of the supplemental nut will not materially weaken this clamping engagement with the bolt, as the inner ends of the threads of the nut will come into firmer clamping engagement with the bolt threads, the distribution of the clamping force being changed but the net clamping effort remaining constant. The supplemental nut, therefore, always retains its position on the bolt and will prevent escape of the main nut from the bolt. If the main nut should become very much loosened and beyond a limit within which the supplemental nut would compensate, the supplemental nut would then have to be drawn up farther and re-set into locking engagement with the main nut. Thus slight loosening or displacement of the main nut will be compensated for by the supplemental nut, and in case of extraordinary loosening of the main nut the supplemental nut can readily be re-set to restore the locking conditions. The main nut and supplemental nut can have the same outer dimensions so that the same wrench or other tool can be used for both. By having the flange 2 within the faces of the nuts an annular clearance space 11 is provided for the tightening tool so that both nuts can be drawn up in most efficient manner. The outer faces 12 of the supplemental nut will, of course, incline as the nut is drawn into locking engagement, but the wrench or other tool can be prevented from slipping off by being applied to the inner edges 13 of the supplemental nut, such application being permitted by the ample clearing space 11.

Referring to Figs. 7, 8 and 9, the outer face of the flange 2 instead of being all within the nut faces can taper gradually from the nut faces to the end 4 of the flange, and instead of the annular pocket 3 having a triangular cross-section, as shown in Fig. 3, the cross-section can be rectangular, as best shown in Fig. 9. Both the main and the supplemental nuts can, of course, be square or hexagonal or of any other peripheral form. The full efficient use of the main nuts in their ordinary capacity is in no wise impaired and the nut can be applied either with its base or with the flange against the work to be secured. Both main and supplemental nuts can also be readily and inexpensively manufactured by machinery.

I do not wish to be limited to the precise forms of nuts which I have shown, as modifications could readily be made which would still come within the scope of my invention whose main feature is the provision of annular projection on the main nut forming a pocket and for being engaged at its end by a flexible supplemental nut to cause flexure of the supplemental nut and thereby clamping engagement both in a radial and longitudinal direction with the bolt.

I, therefore, desire, to secure the following claims by Letters Patent.

1. In lock nut mechanism, the combination of a main nut, an annular flange extending from one face of said main nut and forming an annular pocket, and a flexible supplemental nut for abutting along a circular line against the outer end of said flange to be deflected thereby when said main and supplemental nuts are applied to a bolt.

2. In combination, a bolt, a main nut engaging said bolt, a circular projection from one face of said main nut, and a comparatively thin flexible supplemental nut abutting against the end of said projection and deflected by such abutting engagement to force its threads radially in all directions into clamping engagement with the bolt.

3. In lock nut mechanism, the combination of a main nut, an annular flange extending from one face of the main nut and forming the outer wall of an annular pocket when the nut is applied to a bolt, and a comparatively thin, flexible supplemental nut, said supplemental nut being primarily flat and adapted when applied to the bolt to engage along a circular line with the end of said flange, and when drawn forcibly against the end of said flange to be dished to thereby both radially and longitudinally uniformly clamp said bolt to lock itself and the main nut to the bolt.

4. In lock nut mechanism, the combination of a main nut, an annular flange extending from one face of the main nut and forming the outer wall of an annular pocket when the main nut is applied to a bolt, and a primarily flat comparatively thin and flexible supplemental nut threaded to receive the bolt and to be drawn up forcibly against the outer end of said flange, engagement of said flange with said supplemental nut causing the entire outer section of the supplemental nut to be uniformly deflected outwardly and the entire inner section thereof to be uniformly drawn into said pocket whereby said supplemental nut will securely clamp the bolt uniformly at all points in a radial direction and will exert longitudinal clamping pressure against the bolt and the main nut to thereby securely lock itself and the main nut to the bolt.

5. In lock nut mechanism, the combination of a main nut having a threaded central opening for receiving a bolt, an annular flange extending from one face of the nut at a point intermediate said threaded opening and the outer faces of the nut and having a comparatively sharp outer end, and a comparatively thin and flexible supplemental nut having a central threaded opening for receiving a bolt, said supplemental nut being primarily flat, said supplemental nut when applied to the bolt abutting against the end of said flange to be dished outwardly to uniformly clamp the bolt at all points in a radial direction and in a longitudinal direction to lock itself and the main nut securely to the bolt.

In witness hereof, I hereunto subscribe my name this 13th day of November A. D. 1909.

JOHN PERRIE.

Witnesses:
 CHARLES J. SCHMIDT,
 NELLIE B. DEARBORN.